United States Patent [19]

Pickens

[11] 4,290,123

[45] Sep. 15, 1981

[54] TOWED ARRAY CONDITION APPRAISAL SYSTEM

[75] Inventor: George O. Pickens, San Diego, Calif.

[73] Assignee: The United States of America as represented by the Secretary of the Navy, Washington, D.C.

[21] Appl. No.: 126,589

[22] Filed: Mar. 3, 1980

[51] Int. Cl.³ .............................................. H04R 29/00
[52] U.S. Cl. ....................................... 367/13; 367/19; 367/130; 73/1 DV
[58] Field of Search ........................... 367/13, 19, 130; 73/1 DV

[56] References Cited

U.S. PATENT DOCUMENTS 3,439,319 4/1969 Whitfil, Jr. ............................ 367/19
4,160,228 7/1979 Hix et al. ............................... 367/13

Primary Examiner—Richard A. Farley
Attorney, Agent, or Firm—R. S. Sciascia; Ervin F. Johnston; James O. Skarsten

[57] ABSTRACT

A device is structured to pass along a towed array of hydrophones, from the forward end thereof to the rearward end thereof. The device carries a small acoustic projector to project test signals to respective hydrophones as the device passes them by. The responses of respective individual hydrophones to the test signals are recorded to enable calibration of the array in situ, and additionally, or alternatively, are recorded to determine the departure of the array from the ideal straight, (generally) horizontal line.

23 Claims, 7 Drawing Figures

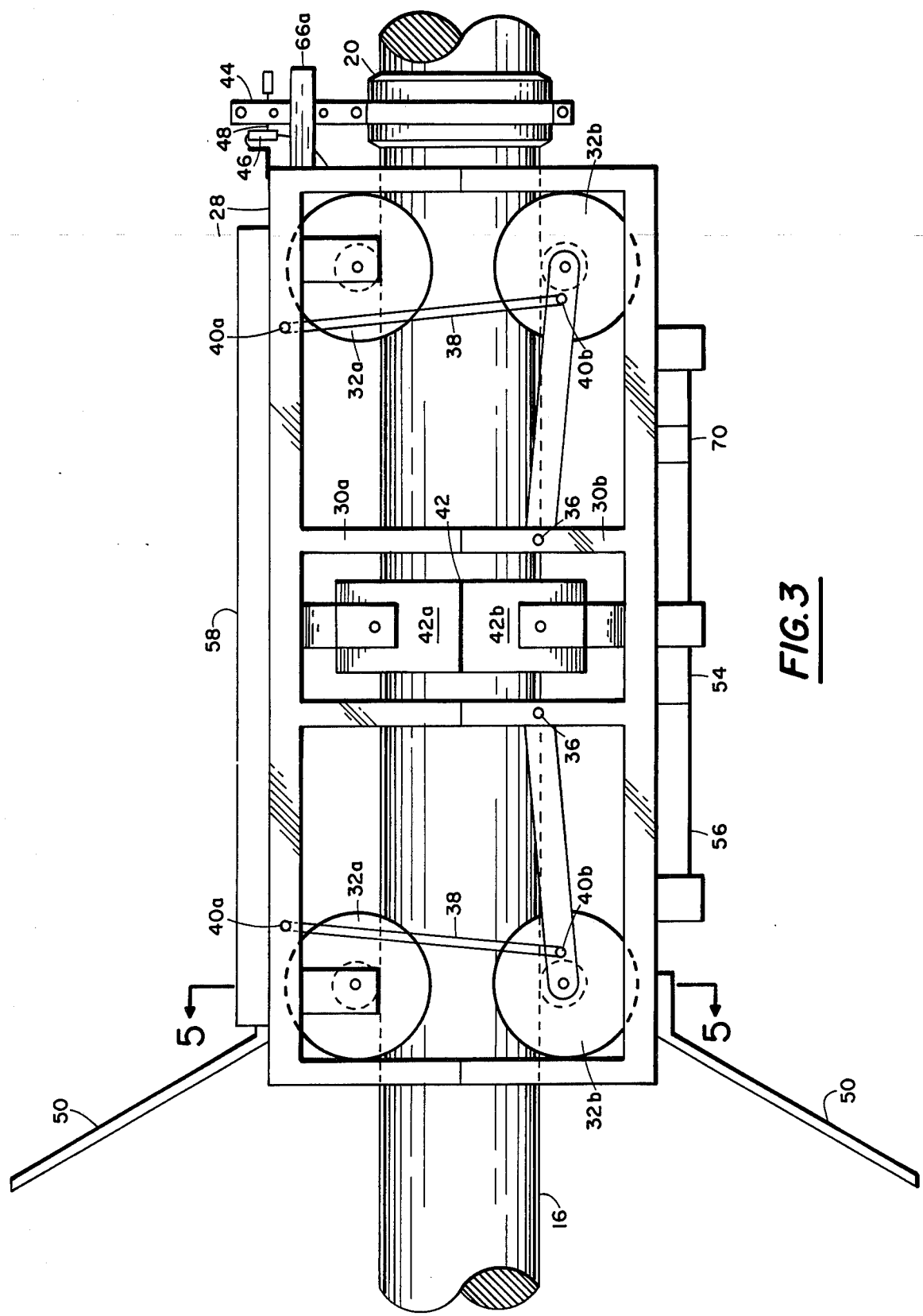

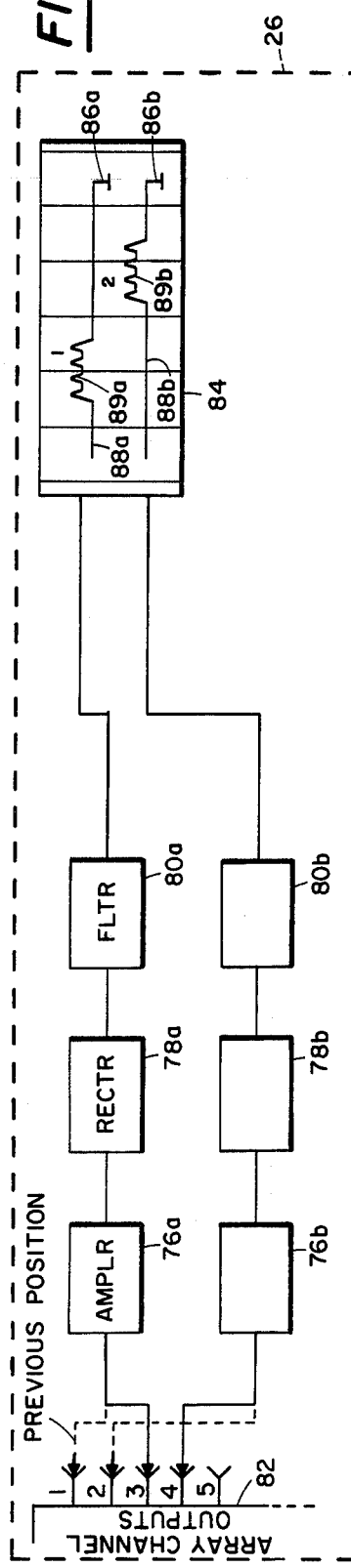
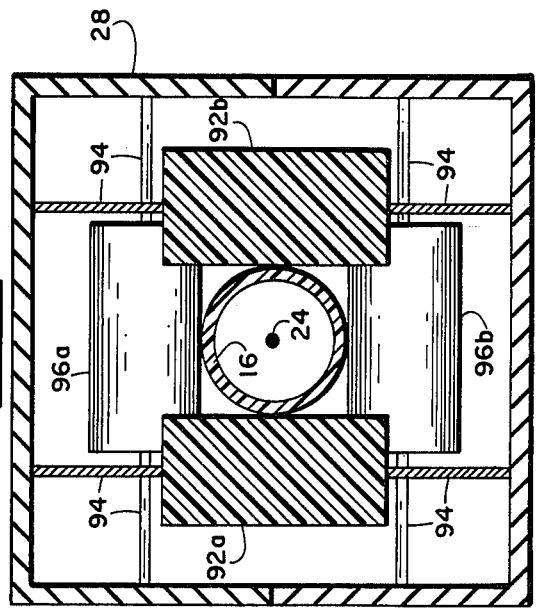
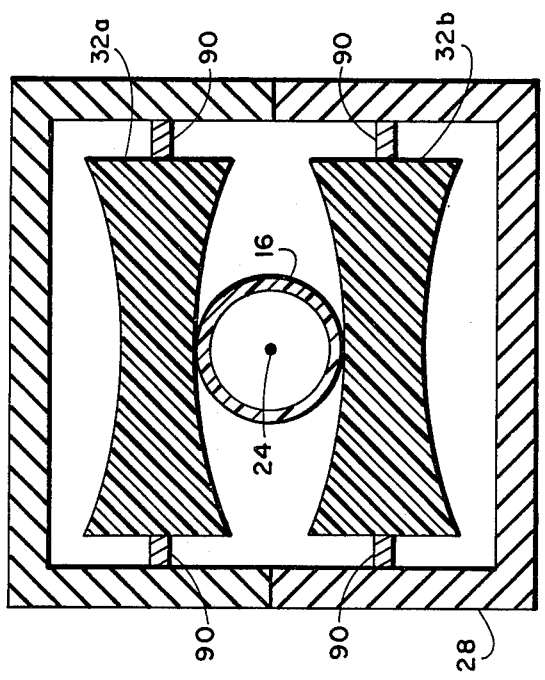

TOWED ARRAY CONDITION APPRAISAL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to the field of in situ measurement of various parameters which must be determined in order to improve the performance of a towed array. More particularly, the invention pertains to a system for both calibrating and determining the horizontal displacements of the hydrophones of an array, while the array is being towed through an ocean environment. Even more particularly, the invention pertains to a system of the above type which operates by monitoring the responses of discrete hydrophones to locally generated acoustic test signals, the array being linear and the hydrophones being distributed along the length thereof.

The gathering of data in an acoustic environment by means of an array of electrically interconnected hydrophones is of increasing importance, both for commercial and military purposes. Such arrays are usually linear, and comprise a number of hydrophones distributed over a length which is generally in excess of 300 feet. In order to gather data in an acoustic environment comprising a particular ocean area, one end of a linear hydrophone array is usefully coupled to a towing vessel, which then navigates through the area. The individual hydrophones cooperate or interact to provide a beam, which may be steered to determine the bearing from the array of various acoustic sources.

Over a period of time, the detection capabilities of individual hydrophones in a towed array may unpredictably vary. Consequently, to accurately interpret information provided by the array, calibration of some sort must be performed. In the prior art, various techniques are available for calibrating large sections of a hydrophone array. For such calibration, a calibration or test signal of selected frequency is projected to the array so that it is received simultaneously by every hydrophone of the array section. In cases where multiple hydrophones input an acoustic channel, the gross or collective response of the hydrophones to test signal includes the individual responses of defective hydrophones. In a patent application filed with the U.S. Patent and Trademark Office on Nov. 3, 1978 under Ser. No. 957,391, U.S. Pat. No. 4,205,394 issuing thereon on May 27, 1980, the applicant has disclosed a very useful and highly transportable system which falls into the above class of calibration techniques.

In an alternative approach to the calibration of a towed acoustic array, the responses of individual hydrophones of a channel of an array are monitored, hydrophone by hydrophone, to determine their respective sensitivities to a test signal. However, due to the very large number of discrete hydrophones or hydrophone elements in an array, which may have a length on the order of one mile, such calibration technique is extremely tedious. In addition, such calibration would probably have to be performed at a shore installation, so that changes in hydrophone characteristics occurring after deployment of the array at sea would not be included.

In a third calibration approach, the sensitivity of individual hydrophones of an array are indirectly determined, while the array is deployed, by monitoring an acoustic source which is not located at or focussed upon any individual hydrophone. In this approach, multipath effects interfere with sensitivity measurements. As far as is known, the prior art does not provide any direct means for measuring the sensitivity of the individual hydrophones of a linear towed array during array deployment. Yet it is clear that accuracy of data gathering is maximized by calibrating hydrophones thereduring.

In order to employ a linear towed array to determine the bearing of an acoustic source, it is necessary to know the positions of the respective hydrophones of the array, in relation to one another. It is therefore common practice in the art to assume that all of the hydrophones lie on the same line, at known distances therealong. However, such assumption is often invalid, such as when the towing vessel is unable to maintain a straight track through the ocean, or when a portion of the array sinks to a lower depth than another portion thereof. If the above assumption becomes too inaccurate, beamforming capability suffers and source bearing detection by means of the array may become unacceptably inaccurate.

In his invention, the Applicant discloses a system by which the actual detection capabilities of respective hydrophones lying along a linear towed array may be directly measured while the array is deployed in acoustic data gathering operations. The system of the invention may also be modified to determine variations in array depth and heading along its entire acoustic aperture.

SUMMARY OF THE INVENTION

In the present invention, apparatus is provided for determining or reconfirming the value of parameters which must be known in order to successfully operate an array of interconnected acoustic sensor elements. The apparatus includes means for projecting test signals of selected acoustic frequencies, and further includes cart means for successively bringing the projecting means into a selected, closely spaced relationship with each of the sensor elements included in a length of the array. Control means are provided for controlling the operation of the cart means, and other means coupled to the sensor elements monitor the response of a given sensor element to test signals when the projecting means and the given sensor element are in the above closely spaced relationship.

Preferably, the towed array comprises a linear array of acoustic sensor elements, and is deployable in an ocean environment. The cart means includes a supporting frame to which an annular projecting means is fixably joined, the cart means further including roller means for enabling the linear array to be freely passed through the supporting frame and the projecting means. Preferably also, test signals projected by the annular projecting means are of suitable strength so that the response thereto of a discrete sensor element is readily discernible from the responses of other elements when the discrete element and the projecting means are in the above closely spaced relationship.

In a preferred embodiment, means are provided for retaining the cart means and the projecting means at the forward end of the linear array until a selected time.

Thereafter, the cart means is released. Drogue means are joined to the cart means to retard motion thereof through the ocean environment, so that upon release, relative motion occurs between the cart means and the array, the array passing through the cart means and projecting means. The response of each hydrophone to test signals as it passes through the annular projecting means is amplified and recorded to determine the acoustic sensitivity thereof. Also, by projecting signals having separated and independently varying frequencies which represent the depth and heading of the cart, useful information for determining array orientation is provided.

In addition to the above apparatus, the present invention provides a method for determining selected parameters related to the operation of an array of acoustic sensor elements. Such method comprises the steps of: deploying the array in an environment from which acoustic data is to be gathered; operating an acoustic projector to project test signals of selected acoustic frequencies; providing relative motion between the projector and the array so that each of the acoustic sensor elements lying along the array is successively brought into closely spaced relationship with the projector; and monitoring the response of an acoustic sensor element when the sensor element and the projector are in such closely spaced relationship.

OBJECTS OF THE INVENTION

An important object of the present invention is to provide a system for calibrating the individual acoustic sensor elements of a towed array while the array is deployed in an acoustic medium.

Another object is to show the displacements of individual hydrophones of a towed linear array, from their ideal positions along a straight horizontal line, by measuring depth and tangental heading variations along the acoustic aperture.

Another object is to provide a simple and practical system for calibrating an acoustic array by directly measuring the sensitivity of each individual hydrophone of the array at the same time that the array is deployed and operational.

Another object is to provide a system for simultaneously calibrating and identifying horizontal displacement errors of each of the hydrophones in a linear array of hydrophones deployed in an ocean environment, by generating acoustic signals which are a combination of calibration signal and signals conveying depths and headings at each hydrophone along the array.

These and other objects of the invention will become more readily apparent from the ensuing specification when taken together with the drawings.

BRIEF DESCRIPTION OF THE DRAWINGS

FIG. 3 is a perspective view showing the embodiment of FIG. 1 secured to the towed array, in its initial stage of operation.

FIG. 4 is a schematic view showing a monitoring device for the embodiment of FIG. 1.

FIG. 5 is a cross-sectional view taken along lines 5—5 of FIG. 3.

FIG. 6 is a cross-sectional view showing modified rollers for the embodiment of FIG. 1.

DETAILED DESCRIPTION OF THE PREFERRED EMBODIMENT

Figure 1:
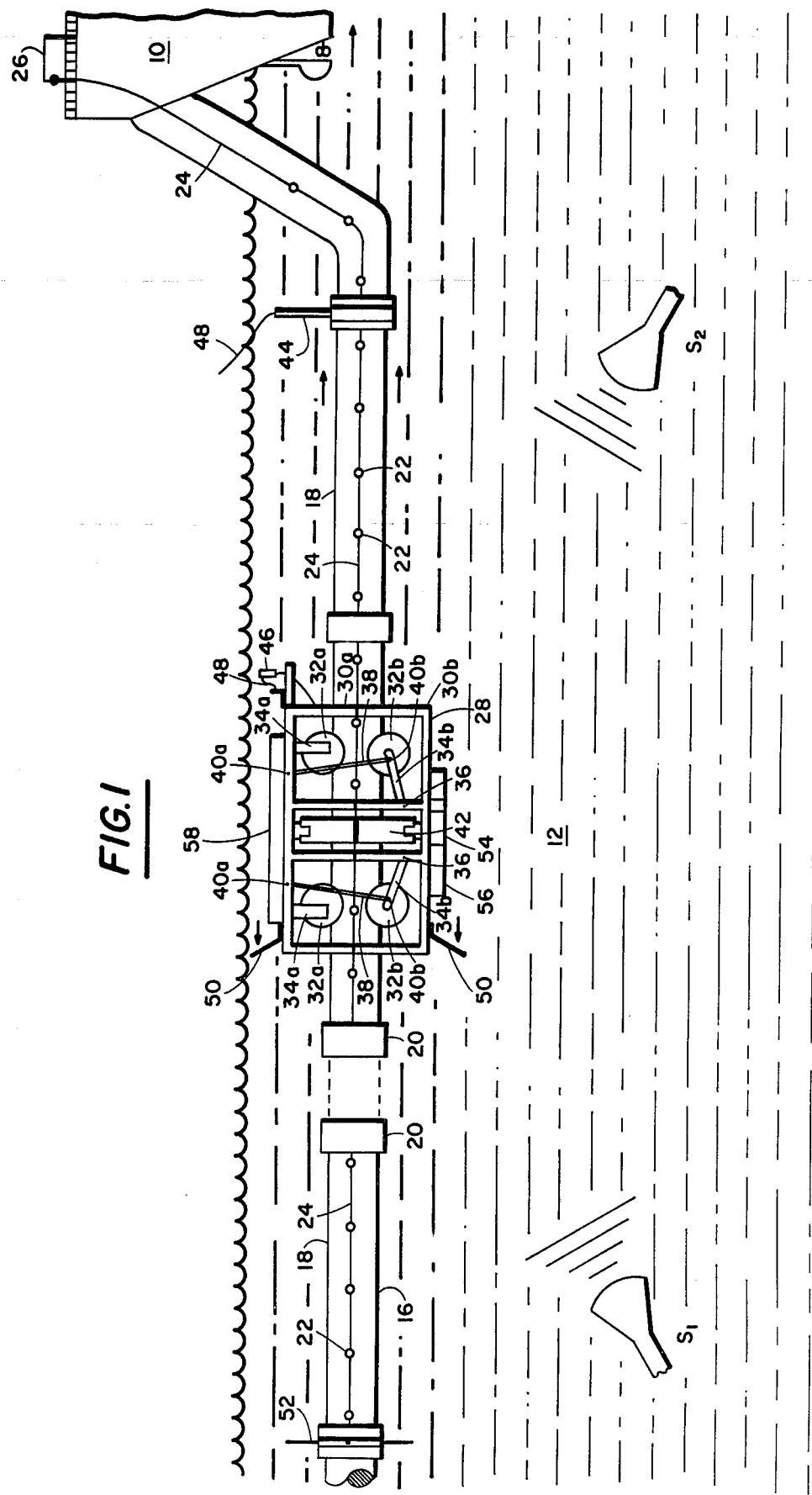
FIG. 1 is a side view showing an embodiment of the invention employed to monitor a linear towed array which is deployed in an ocean environment.

Referring to FIG. 1, there is shown a towing vessel 10 maneuvering through an ocean area 12 which contains sources of acoustic information such as sources $S_1$ and $S_2$, such sources lying at a great range from vessel 10. In order to detect the presence and bearing of sources $S_1$ and $S_2$, a conventional linear hydrophone array 16 is towed through environment 12 by vessel 10. Array 16 may comprise, for example, a number of 150-foot array segments 18, adjacent segments being joined by couplings 20 to form an array of selected length, which may be in excess of one mile. If an array segment 18 is included in the "acoustic aperture" of array 16, it contains one or more separate acoustic channels enclosed within a protective hose, each channel generally, but not always, comprising multiple discrete hydrophones 22, which are connected in series and parallel combinations. Hydrophones of a channel are interconnected with one another by means of electrical conductors in tow cable 24, and are generally coupled thereby to a monitoring device 26, described hereinafter.

Referring further to FIG. 1, there is shown a carrying structure or cart 28, which includes frame components 30a and 30b and rollers 32a and 32b. Each roller 32a is rotatably joined to frame component 30a by means of a roller support 34a, which is fixably joined to frame component 30a. Each roller 32b is attached to frame component 30b by means of a roller support 34b, which is pivotably joined to frame component 30b at a pivot point 36. Frame components 30a and 30b are joined by means of rubber bands, 38, each rubber band being looped about a stud 40a, attached to frame component 30a, and a stud 40b, attached to a pivotal roller support 34b. It will be readily apparent to one of skill in the art that tension springs or the like may be readily substituted for rubber bands 38.

Cart 28 supports an annular acoustic projector 42, described hereinafter in greater detail, which surrounds array 16. Initially, carrying structure 28 is secured at the forward end of array 16, by releasably attaching it to a flat tethering member 44. Member 44 is fixably joined to the forward end of linear array 16 in perpendicular relationship. To commence monitoring activity, cart 28 is released from tethering member 44, by employing a cutting mechanism 46 to severe a retaining wire 48. Thereupon, drogue or sea anchor components 50, joined to cart 28, cause cart 28 and projector 42 to become substantially dead in the water, so that relative motion occurs between array 16 and projector 42. The internal diameter of annular projector 42 is selected in relation to the largest cross section of array 16, so that any portion of array 16 may unimpededly pass through projector 42. Consequently, when wire 48 is cut, cart 28 and projector 42 traverse the entire length of array 16, from the forward end thereof to the after end thereof.

Given the above constraint on projector inner diameter, and to such extent as is compatible therewith, the internal diameter is further selected to be as small as practical, so that the major contribution to the output of an acoustic channel is provided by a single hydrophone of the channel which is encircled by annular projector 42.

Because of the presence of couplings 20, and also because of the non-rigid nature of the hoses of respective array segments 18, the diameter of array 16 varies along its length. However, by providing the combination of rubberbands 38 and pivotal roller supports 34b, the spacing between a roller 32a and a roller 32b, in opposing relationship therewith, varies, accommodating such variable array diameter.

Projector 42 projects acoustic test signals of sufficient amplitude that the response of a particular hydrophone 22 thereto, when the hydrophone is encircled thereby, is well in excess of background noise. Consequently, selected characteristics of an individual hydrophone may be readily determined.

In order to calibrate, or determine the actual acoustic sensitivity of each hydrophone, projector 42 projects a continuous test signal having a fixed frequency of, for example, 256 Hz. The responses of respective hydrophones to such test signal are coupled to monitoring device 26, hereinafter described, and determined thereby by means of a combination of conventional signal processing and recording techniques.

To determine another characteristic of the hydrophones of array 16, i.e., the respective displacements thereof from one another, depth and/or magnetic heading sensors are mounted on cart 28. Projector 42 responds to sensor outputs at a given time by projecting signals which represent the depth and heading of cart 28 at the given time. Since the distance along array 16 of respective hydrophones is known, the hydrophone being ensonified at the given time may be readily determined, and the positions of carrier 28 along array 16 can be repeatedly determined with great accuracy. The depth and horizontal orientation of small portions of array 16 are thereby successively indicated. Such information may be combined to supplement positional information provided by depth and heading sensor elements distributed along array 16, according to conventional practice. It is anticipated that projector 42 could be operated to simultaneously project signals for determining calibration and positional information, while array 16 was being operated to detect acoustic data in environment 12.

To prevent the loss of cart 28, containing among other things projector 42, a cross-shaped barrier 52 is clamped to a coupling 20 at the after end of linear array 16 to terminate its progression relative to the array. An electrical package 54 is joined to cart 28, which includes a battery 56 for providing power to projector 42, and also to provide power for electronic devices contained in package 54. Flotation material 58, such as syntactic foam, is also joined to cart 28, to achieve a neutral buoyancy for the assembly which includes cart 28, projector 42, and electrical package 54.

Figure 2:
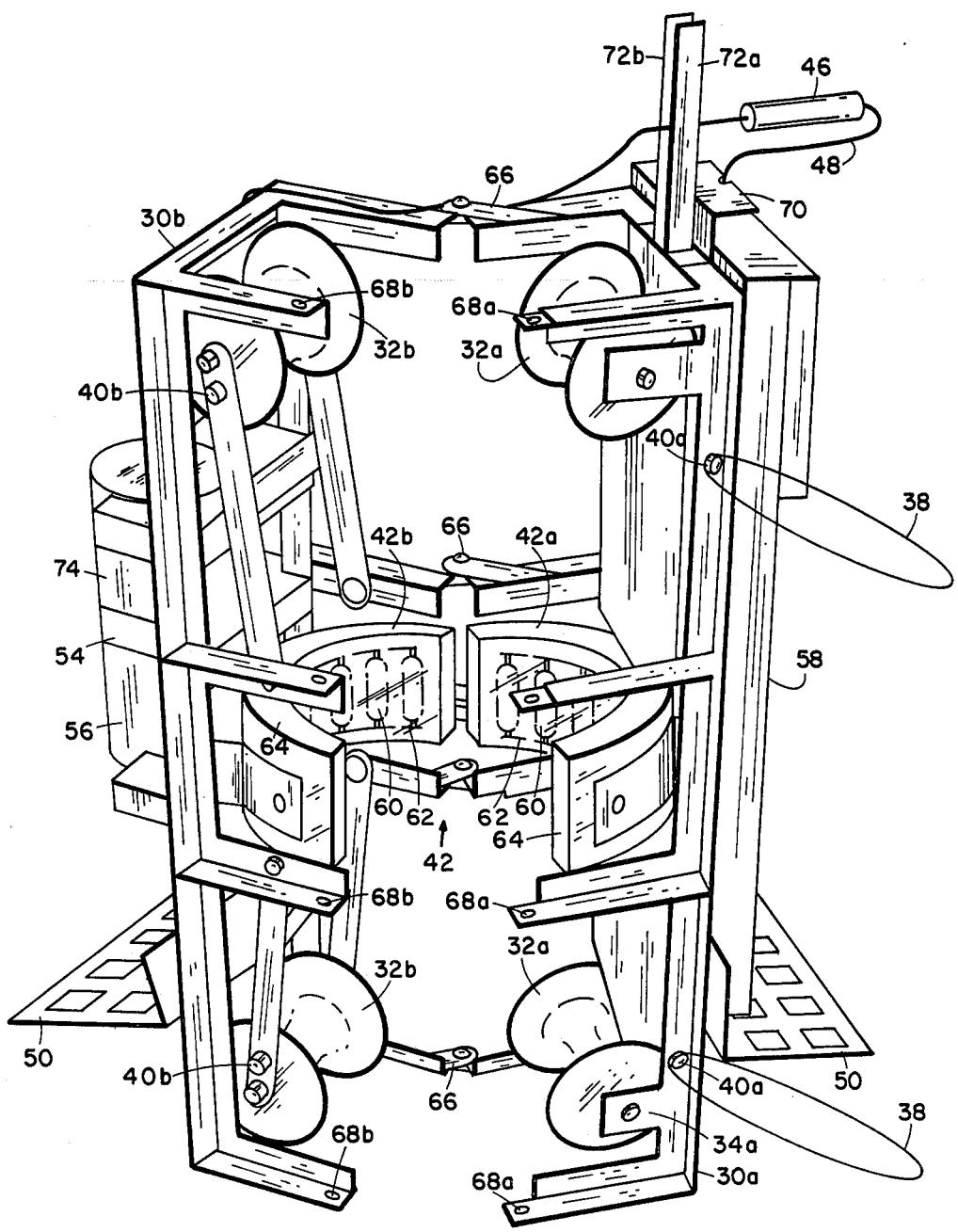
FIG. 2 is a perspective view showing the embodiment of FIG. 1 in a non-operative mode.

Referring to FIG. 2, there is shown annular projector 42 comprising two semi-circular components 42a and 42b, each component including a selected number of acoustic projector elements 60 which are electrically interconnected by means of conductors 62. Projector elements 60 and conductors 62 are usefully encased in a solid material 64, such as polyurethane, which may be readily molded to provide the semi-circular configurations of components 42a and 42b. Components 42a and b are respectively secured to frame components 30a and 30b. Hinges 66 allow frame components 30a and b and projector components 42a and b to be respectively joined and separated to respectively position projector 42 around array 16, in substantially coaxial relationship, and to remove projector 42 and cart 28 from around the array. Sets of matching holes 68a and b are provided in frame components 30a and 30b for receiving screws to secure projector 42 around array 16.

It is to be noted that other configurations of projectors or projector elements 60 could be employed to project signals to hydrophones of the array. However, the above circular configuration of projector 42 has been found to be better in adjusting for errors resulting from imperfect coaxial alignment of projector 42 and array 16. Imperfect alignment can result in successive hydrophones experiencing different sound fields.

Referring further to FIG. 2, there is shown a strip of angled metal 70 joined to frame component 30a, one end of restraining wire 48 being fixably attached thereto. Adjacent to strip 70 are two flat prongs 72a and b, which are likewise fixably attached to frame component 30a. Prongs 72a and b are in spaced apart relationship, so that a flat thin strip of tethering member 44 may be received therebetween when structure 28 and projector 42 are at the forward end of array 16, prior to the severing of restraining wire 48. Prongs 72a and b cooperate with tethering member 44 to prevent rotational motion between structure 28 and array 16 prior to the severing of wire 48.

In order to sever restraining wire 48 at a particular preselected time, a device 74 is included in electrical package 54 which comprises a presettable timing device, set to the preselected time. At the preselected time, device 74 causes an electric current to be coupled from a storage capacitor, deriving its charge from battery 56, to an explosive squib charge in mechanism 46, detonating the charge. A small guillotine device included in mechanism 46 is thereupon operated to cut wire 48.

Referring yet again to FIG. 2, there are shown drogue components 50 comprising angled sheets of selectively perforated plastic which may be permanently positioned. Alternatively, components 50 may be maintained in an inoperable mode until wire 48 is cut, and thereafter be brought into an operable mode.

Referring to FIG. 3, there is shown structure 28 and projector 42 joined around the forward end of array 16, prior to the preselected time. Structure 28 is secured to tethering member 44 by means of restraining wire 48, and tethering member 44 is positioned between prongs 68a and b to prevent rotation of cart 28 around array 16 as aforementioned.

Referring to FIG. 4, there is shown monitoring device 26, comprising amplifiers 76a and b, rectifiers 78a and b, filters 80a and b and a path panel 82. Each channel of array 16 is coupled to a different output terminal of panel 82. Device 26 further includes a strip chart recorder 84, provided with dual marking pens 86a and b for making traces 88a and b, respectively. Pen 86a receives a channel output through amplifier 76a, rectifier 78a, and filter 80a, and pen 86b receives a channel output through amplifier 76b, rectifier 78b, and filter 80b. Rectifier 78a and b and filters 80a and b respectively combine to form envelope detectors.

Respective channel outputs of array 16 are usefully recorded by successively coupling the inputs of amplifiers 76a and b to the outputs of patch panel 82, in an alternating fashion. Each set of peaks 89a therefore represents the responses of hydrophones of channels coupled to odd-numbered patch panel terminals, and each set of peaks 89b represents the responses of hydrophones of channels coupled to even-numbered terminals. A peak is recorded in a trace when a hydrophone of its corresponding channel is encircled by projector 42. From its recorded peak, the sensitivity of the individual hydrophone, and also whether it is wired with the correct polarity, can be determined.

Referring to FIG. 5, there are shown rollers 32a and b rotatably joined to cart 28, by means of pins 90, in opposing relationship. Each roller 32a and b has an hour glass-shaped cross section, and is formed of hard plastic or other rigid material. By providing such hour glass cross section, sets of rollers 32a and b, distributed along cart 28, cooperate with rubberbands 38 to maintain annular projector 42 and array 16 in substantially coaxial relationship, or alternatively, enable the array to be freely moved along its center line in relation to projector 42 and cart 28.

Referring to FIG. 6, there is shown a modified system of rollers for maintaining array 16 in coaxial relationship with projector 42. In such modification, sets of rollers 92a and b are rotatably joined to cart 28 at selected positions therealong, by means of pins 94. The rollers 92a and b of a set are in spaced relationship with one another, array 16 passing therebetween. The spacing between rollers 92a and b of a set is selected to constrain movement of array 16 in a first degree of freedom. Other sets of rollers 96a and b are rotatably joined to cart 28 at other positions along cart 28, in like manner as rollers 92a and b. However, each set of rollers 96a and b is oriented to constrain movement of array 16 in a second degree of freedom which is orthogonal to the first degree of freedom. Each roller 92a and b and 96a and b is cylindrical, but is formed of soft material, such as polyurethane, open cell foam, in order to conform to the circular cross section of array 16.

Figure 7:
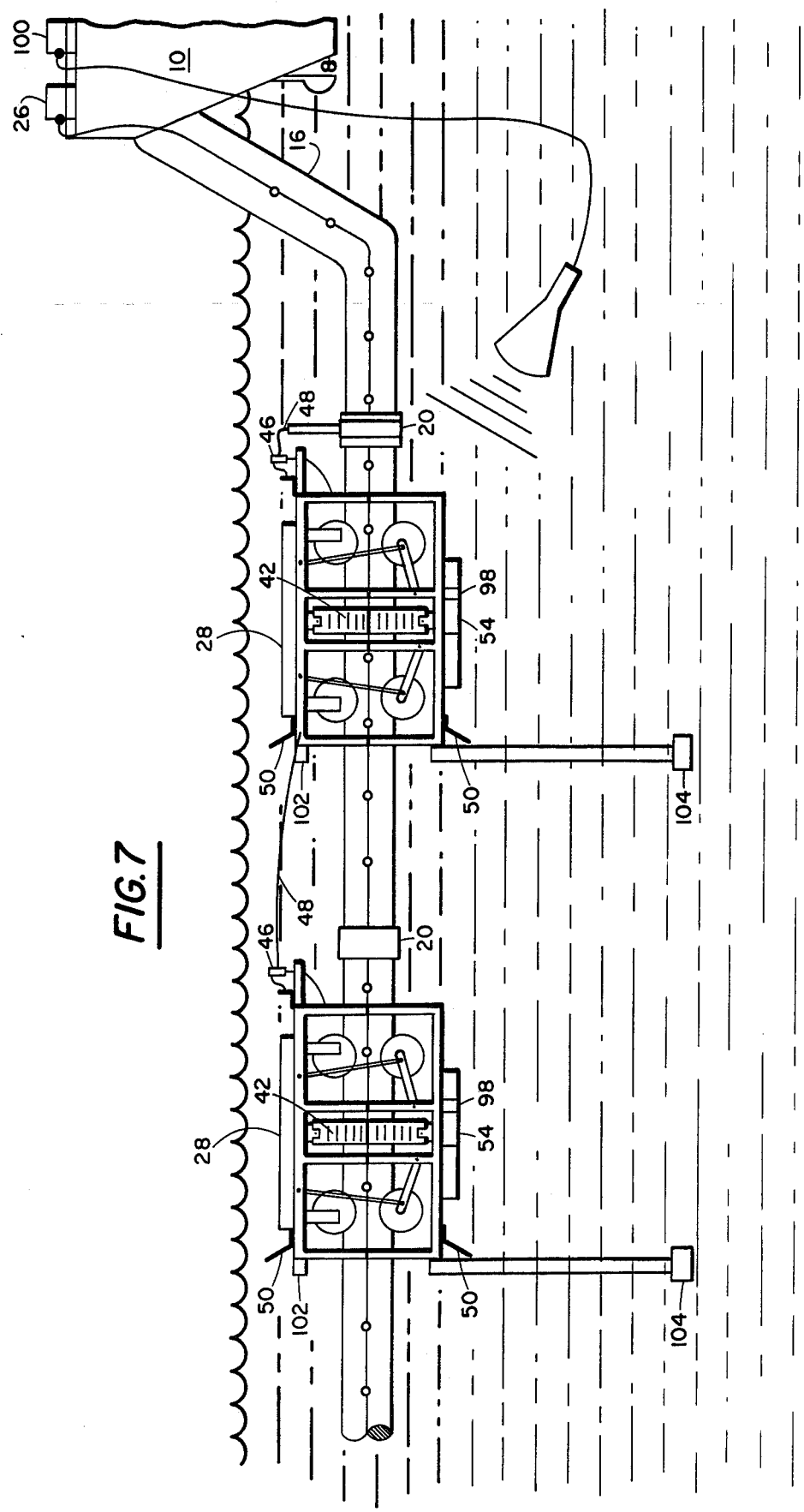
FIG. 7 is a side view showing a modification of the embodiment of FIG. 1.

Referring to FIG. 7, there is shown a modification of the invention, wherein more than one cart 28 is initially tethered to the forward end of array 16. Each cart includes a projector 42, an electrical package 54 and drogue 50, as hereinbefore described. However, instead of a timing device 74, the electrical package of each cart is provided with an electronic device 98, which receives and decodes acoustic signals, and which operates mechanism 46 to cut wire 48 upon receiving a particular coded acoustic signal. Consequently, a particular cart 28 can be released from the forward end of array 16 on command, by employing acoustic projection apparatus 100 to generate a particular coded acoustic signal. Each of the carts 28 of FIG. 7 may be released at different times, so that characteristics of the hydrophones of array 16 may be monitored at different periods during the deployment of array 16.

Referring further to FIG. 7, there is shown a depth sensor 102 and a heading sensor 104 mounted on aft cart 28, the heading sensor being positioned some distance from array to reduce effects of local magnetic fields of array structure. The electrical package 54 of a cart inludes electronics responsive to the outputs of sensors 102 and 104 for operating the projector 42 of the cart to project frequencies, or otherwise coded tones or pulse sequences, which convey the depth and heading data from the cart. The aforementioned respective displacements of hydrophones 22 of array 16 is thereby provided.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for determining selected parameters related to the operation of an acoustic array which contains a number of interconnected sensor elements, said apparatus comprising:
   means for projecting test signals of selected acoustic frequencies;
   cart means for successively bringing said projecting means into selected, closely spaced relationship with each of said sensor elements included in a length of said array, said cart means comprising a supporting frame to which said projecting means is fixably joined, and roller means for enabling said array to be moved along its centerline in relation to said cart means and said projecting means;
   means for controlling the operation of said cart means; and
   means coupled to said sensor elements for monitoring the response of a given one of said sensor elements to said test signals when said projecting means and said given sensor element are in said closely spaced relationship.

2. The apparatus of claim 1 wherein said array comprises a linear array of sensor elements which is deployable in a liquid medium, and wherein:
   said projecting means comprises means for projecting acoustic test signals so that the response to said test signals of a particular one of said sensor elements is discretely detectable when said particular sensor element and said projecting means are in said closely spaced relationship.

3. The apparatus of claim 2 wherein said projecting means comprises:
   a selected number of acoustic signal projection elements; and
   means joined to said supporting frame for maintaining said acoustic projection elements in an annular array, the inner dimensions of said annular array being selected in relation to the largest cross-sectional area of said linear array so that said length of said linear array is enabled to freely pass through said annular array.

4. The apparatus of claim 3 wherein:
   said roller means comprises a selected number of pairs of rollers, the rollers of a given pair being positionable so that they are in opposing relationship and in contact with the outer surface of said linear array; and
   said cart means includes a securing means for cooperating with said roller means to maintain said projecting means and said array in closely spaced, substantially coaxial relationship.

5. The apparatus of claim 4 wherein said linear array is deployed in an ocean environment, one end of said linear array comprising a forward end and the other end of said linear array comprising an after end, said forward end receiving a towing force, and wherein said controlling means includes:
   means for retaining said cart means and said projecting means at said forward end of said linear array until a selected time, and for enabling said cart means and said projecting means to traverse said linear array after said selected time; and
   drogue means joined to said cart means for retarding motion of said cart means in order to cause said cart means and said projecting means to traverse said linear array from said forward end to said after end after said selected time.

6. The apparatus of claim 5 wherein said controlling means includes:
   a timing means for generating an activation signal at a preselected time;
   means for securing said cart means and said projecting means to said forward end until said preselected time;
   means responsive to said activation signal for releasing said cart means and said projecting means from said forward end when said activation signal is generated;
   means for resisting rotational motion of said cart means in relation to said array when said cart means and projecting means are secured to said forward end; and
   means joined to said after end of said linear array for retaining said cart means and said projecting means at said after end after said cart means and said projecting means have traversed said linear array.

7. The apparatus of claim 6 wherein:
   a battery is joined to said cart means for providing power for said projecting means and for said timing means; and
   buoyancy means is joined to said carrier means for effecting neutral buoyancy in said ocean environment to an assembly which includes said cart means, said projecting means, and said battery.

8. The apparatus of claim 6 wherein said means for resisting rotational motion comprises:
   a flat thin tethering member which is fixably joined to said forward end of said linear array in perpendicular relationship; and
   first and second flat prongs fixably joined to an end of said carrier means in spaced apart relationship, the spacing between said prongs being selected in relationship to the thickness of said tethering member to enable said tethering member to be received between said first and second prong members when said carrier means is secured to said forward end of said array.

9. The apparatus of claim 8 wherein:
   said securing means includes a wire of selected strength, one end of said wire being joined to said tethering member, and the other end of said wire being joined to said carrier means; and
   said releasing means comprises means joined to said wire and responsive to said activation signal for cutting said wire at said preselected time.

10. The apparatus of claim 5 wherein said controlling means includes:
    means for selectively securing said cart means and said projecting means to said foward end of said array;
    means for projecting an acoustic activating signal into said environment at arbitrarily selected times;
    means joined to said cart means for receiving said acoustic activation signal, and for generating a cart release signal in response to said acoustic activation signal; and
    means responsive to said cart release signal for releasing said cart from said forward end of said array.

11. The apparatus of claim 3 wherein said cart means comprises:
    first and second frame components;
    a selected number of first rollers, each of said first rollers being rotatably joined to said first frame component by means of a first roller support, each of said first roller supports being fixably joined to said first frame component;
    a number of second rollers equal to said number of first rollers, each of said second rollers being rotatably joined to said second frame component by means of a second roller support, each of said second roller supports being pivotably joined to said second frame component; and
    resilient means for joining said first frame component and said second component so that each of said first rollers and each of said second rollers is in contact with the outer surface of said linear array, each of said first rollers being included in a set with one of said second rollers, the first and second rollers of a set being maintained in opposing relationship, said resilient means and said pivotal second roller supports cooperating to vary the spacing between the first and second rollers of a set to enable unimpeded relative motion between said cart means and said linear array as the cross sectional area of said array varies along the length of said array.

12. The apparatus of claim 11 wherein:
    each of said first rollers and each of said second rollers is formed of rigid material, and has an hour glass-shaped cross section for maintaining said annular projection array and said linear array in said coaxial relationship.

13. The apparatus of claim 4 wherein said pairs of rollers comprise:
    first pairs of rollers rotatably joined to said supporting frame for constraining movement of said linear array in a first degree of freedom; and
    second pairs of rollers rotatably joined to said supporting frame for constraining movement of said array in a second degree of freedom which is orthogonal to said first degree of freedom.

14. The apparatus of claim 13 wherein:
    each of said rollers of said first and second pairs is formed of compliant material for conforming to the cross section of said linear array to maintain said annular projection array and said linear array in said coaxial relationship.

15. The apparatus of claim 2 wherein each of said sensor elements comprises a discrete hydrophone, and wherein said monitoring means comprises:
    signal processing means receiving the responses of said hydrophones to said acoustic test signals; and
    strip chart recording means for indicating the response of each of said discrete hydrophones to said test signals.

16. The apparatus of claim 2 wherein each of said sensor elements comprises a discrete hydrophone, and wherein:
    said monitoring means comprises means for monitoring the individual response of each of said hydrophones to a continuous signal included in a selected acoustic frequency range.

17. The apparatus of claim 2 wherein each of said sensor elements comprises a discrete hydrophone, and wherein:
    said apparatus includes means joined to said projecting means for varying the frequency of said projecting means to project signals indicating the depth of said cart means in said environment; and
    said monitoring means comprises means for recording the position of said cart means along said linear array at which a given one of said depth indicating signals is projected.

18. The apparatus of claim 2 wherein each of said sensor elements comprises a discrete hydrophone, and wherein:

said apparatus includes means joined to said projecting means for varying the frequency of said projecting means to project signals indicating the magnetic heading of said cart means in said environment; and said monitoring means comprises means for recording the position of said cart means along said linear array at which a given one of said bearing indicating signals is projected.

19. A method for determining selected parameters related to the operation of a linear array of acoustic sensor elements deployed in a marine environment, one end of said linear array comprising a forward end and the other end of said linear array comprising an after end, said forward end receiving a towing force, said method comprising the steps of:

deploying said array in said environment to gather acoustic data;

operating acoustic projecting means to project test signals of acoustic frequencies;

selectively retaining said projecting means at said forward end of said linear array until a selected time;

selectively releasing said projecting means from said forward end to enable relative motion to occur between said projecting means and said linear array;

guiding said projecting means along said linear array from said forward end to said after end after said projector is released; and monitoring the response of a given one of said acoustic sensor elements when said given sensor element and said projecting means are brought into a closely spaced relationship.

20. The method of claim 19 wherein:

said retaining step comprises the step of retaining a plurality of discrete acoustic projectors at said forward end of said linear array;

said releasing step comprises the step of releasing said projectors from said forward end at different arbitrarily selected times by generating acoustic command signals;

said step of operating said acoustic projecting means comprises the step of projecting test signals such that the response of said given sensor element to said test signals is discretely recordable; and said method includes the step of preventing said projecting means from falling off the after end of said array and being lost.

21. The apparatus of claim 19 wherein:

said step of operating said acoustic projecting means comprises the step of projecting test signals of an acoustic frequency which represents the depth of said projecting means in said environment.

22. Method of claim 19 wherein:

said step of operating said acoustic projecting means comprises the step of projecting test signals having a frequency which represents the heading of said projecting means in said environment at a given time.

23. The method of claim 19 wherein: said step of operating said acoustic projected means comprises the step of projecting test signals of an acoustic frequency which is selected so that the sensitivity of each of said sensor elements may be determined.

* * * * *